Patented May 14, 1929.

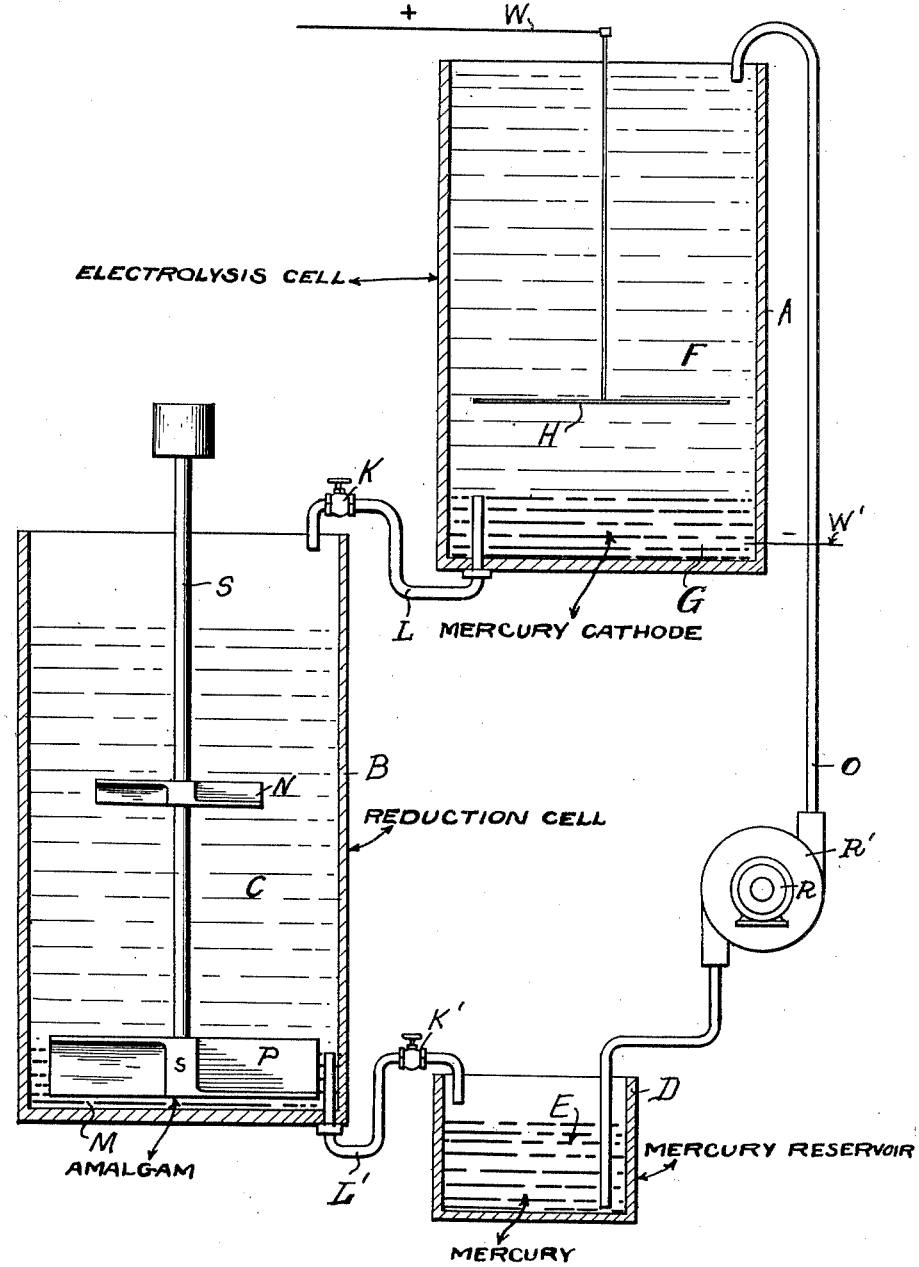

1,712,952

UNITED STATES PATENT OFFICE.

HENRY JERMAIN CREIGHTON, OF SWARTHMORE, PENNSYLVANIA, ASSIGNOR TO ATLAS POWDER COMPANY, OF WILMINGTON, DELAWARE, A CORPORATION OF DELAWARE.

APPARATUS FOR CARRYING OUT ELECTROLYTIC REDUCTION OF SUGARS TO ALCOHOLS.

Application filed March 26, 1926. Serial No. 97,787.

This invention relates to an apparatus for forming sugar reducing amalgams and for utilizing said amalgams in reducing sugar solutions to the corresponding alcohols.

By the use of the apparatus of the present invention various sugars are reduced to the corresponding alcohols in aqueous solution by means of sodium or other alkali metal amalgam which is formed electrolytically, and subsequently added to the sugar solution. The water of the sugar solution decomposes the alkali metal amalgam, there being formed the hydroxide of the alkali metal and nascent hydrogen, the latter reducing the sugar to the corresponding alcohol. Since the continuous decomposition of the amalgam tends to increase continuously the alkalinity of the sugar solution, and since this increase in alkalinity retards the rate of reduction of the sugar, the alkalinity of the sugar solution is decreased from time to time by the addition of sulphuric acid, but the amount of acid added is never sufficient to render the solution acid.

A diagrammatic vertical sectional view of one form of apparatus I have employed is shown in the accompanying drawing. This apparatus consists of an electrolysis cell, A, in which the alkali metal amalgam is formed, a reduction cell, B, in which the sugar contained in the aqueous solution, C, is reduced by the amalgam, and a reservoir, D, containing a supply of mercury E. In the cell, A, is placed an aqueous solution, F, of a suitable compound (hydroxide, chloride) of an alkali metal (sodium, potassium) or an alkaline earth metal (magnesium, calcium). The cell, B, is filled with the aqueous sugar solution C. The solution F is then electrolyzed between a mercury cathode G, (electrical connection being made through the wire W',) and an anode H of a suitable material, (electrical connection being made through the wire W,) the stop-cock K of the tube L being kept closed. When the amalgam produced in cell A attains a desired concentration of alkali metal, the stop-cock K is opened and the amalgam run through the tube L into the sugar solution C contained in cell B, where it falls to the bottom in a body M. The dilute amalgam M and the sugar solution C in the cell B are then stirred vigorously by means of a stirrer S, to which are attached blades N and P, which are disposed in the sugar solution and the mercury, respectively. The place of the amalgam run from cell A into cell B is taken by fresh mercury which is added from the reservoir D, and this pure mercury is converted into another supply of dilute amalgam. After the amalgam added to the cell B has been decomposed by the action of the water, some of the resulting mercury is drawn off into the reservoir D, through tube L', a further quantity of amalgam is run from cell A to cell B, and the proper amount of mercury is transferred from reservoir D to cell A. This process is continued until the sugar has been reduced. From time to time the electrolyte in cell A is renewed. The mercury may be transmitted from reservoir D to cell A, through pipe O, by means of a motor and centrifugal pump designated R and R', respectively. The provision of the pump R' and stop-cocks K and K' in the tubes L, L' renders it possible to expeditiously and easily carry out the transfer of the materials in the manner described.

The tubes L and L' are projected upwardly in the cells A and B, respectively, to such point that the mercury or amalgam, M in cell B and G in cell A, cannot fall below a certain level.

From time to time acid is added to the solution C, until the hydroxide contained therein is almost neutralized.

When the sugar in the solution C is reduced, the solution is removed from the cell B and the corresponding alcohol extracted by a suitable method.

I have reduced both mannose and glucose by this method, and I contemplate the reduction of other sugars, such as xylose, levulose, other pentoses and hexoses, and mixtures of pentoses and hexoses. In fact the method and apparatus are applicable to the reduction of any substance which can be reduced by an alkali metal or an alkaline earth metal amalgam.

Having described my invention, what I claim is:

1. Sugar reducing apparatus comprising an electrolysis cell, a reduction cell, means for discharging an amalgam formed in the first named cell into the last named cell, an agitating means directly engaging the amalgam in the last named cell, a mercury reservoir, means for discharging mercury from the reduction cell into said reservoir and means for discharging mercury from the reservoir into the electrolysis cell, the discharging means for the electrolysis and reduction cell being so formed as to maintain a given amount of mercury in each of said cells.

2. Sugar reducing apparatus comprising an electrolysis cell, a reduction cell, means for discharging an amalgam formed in the first named cell gravitally into the reduction cell, an agitator depending into and directly engaging the amalgam in the reduction cell, a mercury reservoir, means for discharging mercury from the reduction cell into the mercury reservoir by gravity, and a pump for discharging the mercury from the mercury reservoir into the electrolysis cell, the means for discharging mercury from the respective cells, under the influence of gravity, comprising conduits having their mouths disposed a sufficient distance above the bottoms of said cells to maintain a determinate quantity of mercury in each of said cells.

In testimony whereof he affixes his signature.

HENRY JERMAIN CREIGHTON.